Oct. 19, 1926.
W. PETERSEN
1,604,071
TESTING APPARATUS
Filed May 26, 1925   2 Sheets-Sheet 1
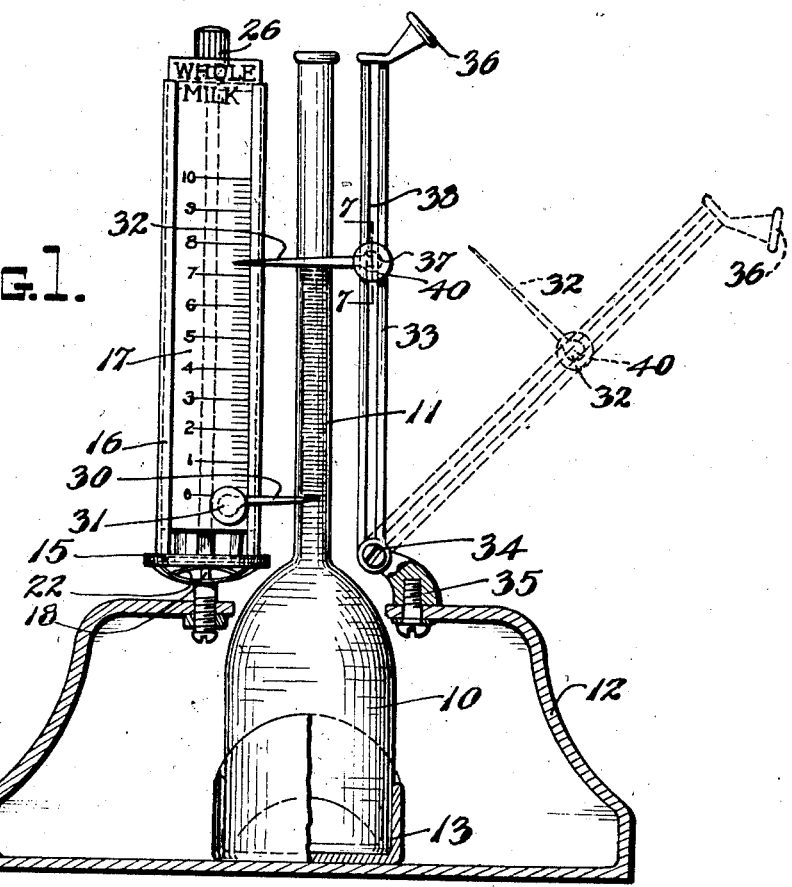
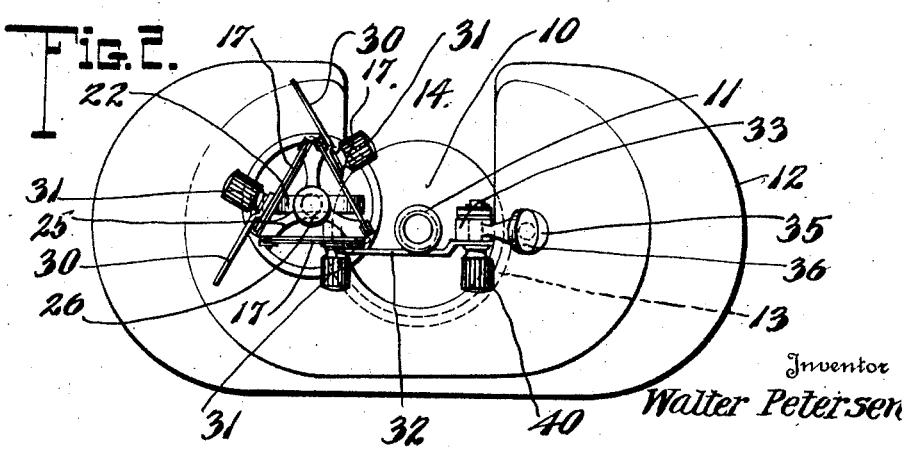
Inventor
Walter Petersen
By Robb & Robb & Hill
Attorneys Oct. 19, 1926.
W. PETERSEN
1,604,071
TESTING APPARATUS
Filed May 26, 1925    2 Sheets-Sheet 2
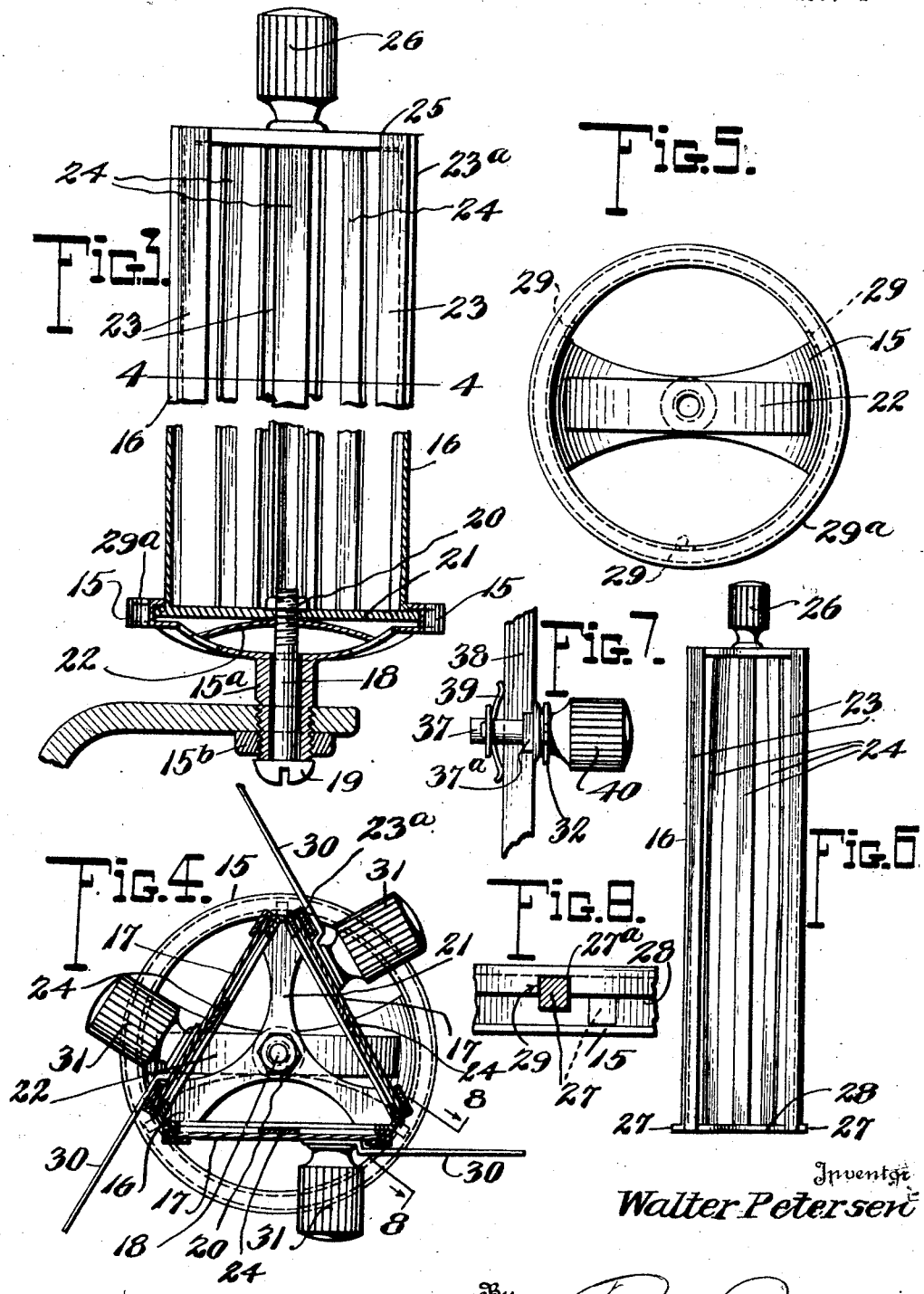
Inventor
Walter Petersen Patented Oct. 19, 1926.

1,604,071

UNITED STATES PATENT OFFICE.

WALTER PETERSEN, OF FERNDALE, CALIFORNIA.

TESTING APPARATUS.

Application filed May 26, 1925. Serial No. 32,974.

This invention relates to a testing apparatus, and particularly to a construction adapted to accurately indicate certain proportions of the contents of a tubular body.

In testing liquids such as cream or milk to ascertain the proportion of butterfat or other constituent therein, it is customary to use a testing bottle or beaker having its neck provided with graduations by which the proportions of its contents may be read. The use of such gradutions is more or less difficult because the base of the column to be measured does not always register with the zero graduations, and the column must consequently be read between intermediate graduations.

A more important practical difficulty results from the fact that such graduations quickly become indistinct or obliterated by handling the measuring vessel and the use of hot water and acids in the testing operations. Any attempt to read such obscured graduations incurs delay, often results in mistakes and inaccuracies, while a material expense is involved in the replacement of otherwise useful bottles simply because of the obliteration of the graduations upon the measuring indicators thereof.

My invention is designed to avoid the necessity for such neck graduations, permitting the use of a bottle without any graduations thereon, and combines therewith a cooperating scale and indicator which are vertically adjustable relative to the neck or test tube portion of the bottle so as to show the proportion of any indicated body therein from the zero point to a point in alignment with a cooperating indicator. Since the contents of the bottle neck may vary in vertical elevation, the scale is provided with a zero pointer cooperating with the neck and vertically adjustable to dispose such indicator at the base of the column to be measured.

It is further desirable to utilize the invention for the measuring of different liquids or bodies in which the scale varies relative to the volume of liquid within the testing neck or tube, and I have therefore provided for such use a plurality of scales rotatably adjustable so as to be separately disposed in cooperative relation with the measuring tube.

In order to permit convenient access in the positioning and removal of the testing vessel, I have also found it important to provide for the withdrawal of the measuring indicator which cooperates with the zero indicator upon the scale, and for this purpose the measuring indicator is mounted upon an adjustable member movable toward and from the scale.

The invention has for an object to provide a novel and improved construction involving a support for a testing vessel and a scale mounted for vertical adjustment relative to the neck of such vessel in association with a cooperating measuring indicator adapted to align with the scale.

A further object of the invention is to provide a novel and improved construction by which the measuring receptacle is supported by a base having disposed at one side of the neck of the receptacle a relatively fixed scale adapted for vertical adjustment while at the opposite side thereof a pivoted arm carrying a measuring indicator is mounted for movement toward and from said scale.

Another object of the invention is to provide, for an extended scope of use, a plurality of scales adjustably carried upon a rotatable frame and cooperating with a pointer upon a complemental member adjustable relative to any one of said scales when positioned in cooperative relation.

Other and further objects and advantages of the invention will be hereinafter set forth and the novel features thereof defined by the appended claims.

In the drawings:

Figure 1 is an elevation of the invention with parts in section;

Figure 2 is a top plan thereof;

Figure 3 is a detail elevation of the scale frame with the lower portion in section;

Figure 4 is a horizontal section on the line 4—4 of Figure 3 with the indicators applied;

Figure 5 is a plan of the support for the scale frame;

Figure 6 is a side elevation of the scale support;

Figure 7 is an enlarged detail on the line 7—7 of Figure 1; and

Figure 8 is a detail of the scale frame lock on line 8—8 of Figure 4.

Like reference numerals designate corresponding parts throughout the several figures of the drawing.

The invention is designed for a wide scope of application in the measurement of a proportion of the contents of a testing vessel or tube by an accurate medium for that purpose. In the present application, the invention is shown in connection with a testing bottle 10 provided with an elongated neck 11 such as is commonly used for the measurement and determination of the butterfat content from milk or cream, however, the invention is not confined to such use.

In the use for the purpose stated the contents of the testing bottle are treated in any preferred manner so that the butter fat rises into the neck of the bottle and in position to be measured by the apparatus and the vertical position of the column of butterfat varies proportionally to the total contents of the vessel at the time of measurement. The bottle 10 is here shown as supported within a hollow base 12 which may be of any suitable configuration and material, and is preferably formed with a central holder 13 to support the body of the bottle in proper position for measuring purposes. To permit the convenient introduction of the bottle this holder may be disposed opposite an open side as shown at 14 in Figure 2.

Supported upon the base is a holder 15 adapted to receive and support the frame 16 which carries the graduated scales 17 used in reading the measurements. One method of thus supporting the parts consists of a shank 15$^a$ from the holder resting upon the base and removably secured at the lower portion of the holder by a nut 15$^b$. The frame 16 is movable upon the holder by a post 18 having a head 19 and provided at its upper end with a nut 20 bearing upon the base 21 of the frame 16. This frame is supported in contact with the nut by means of a flat spring 22 interposed between the base 21 and the holder, as shown.

The frame is composed of a plurality of vertical members 23 which as shown in Figure 4 are provided with keeper 23$^a$ to receive the side edges of the scales 17 which are thereby supported for vertical movement or adjustment. In order to retain these scales in vertically adjusted position the frame is further provided with a series of leaf springs 24 which extend from the base 21 thereof to the top plate 25 and bear against the scales. This top plate is provided with a handle member 26 by which the frame may be bodily rotated upon the post 18. This construction is particularly designed for the use of a plurality of the scales 17 so that they may be separately brought into cooperative relation with the neck 11 of the testing receptacle and such adjustment is accomplished by means of the handle 26 effecting a partial rotation of the scale frame.

When the desired scale is in properly aligned position it is important to retain it against any accidental movement or displacement, and this is effected by means of lugs 27 carried by a flange 28 on plate 21 and cooperating with recesses 29 in the flanged upper edge 29$^a$ of the holder 15. A plurality of these recesses is provided as shown in Figure 5 and one or more of the lugs 27 may be used. Each of the scales has secured at its lower portion a zero indicator 30 comprising an arm or finger projected laterally from the scale for a sufficient distance to cooperate with the body of liquid within the tube or neck portion of the testing vessel. This zero indicator is also formed with a handle 31 which forms means by which the scale may be vertically adjusted within its keeper so that the indicator 30 is brought to the base of the column of material or liquid to be measured and the measurement always reads from zero.

Cooperating with the zero indicator or pointer is a measuring pointer 32 which may be mounted in any desired manner for vertical adjustment but is here shown as carried by an arm 33 pivoted at 34 upon a lug 35 carried by the base. The upper end of this arm is formed with a handle 36 for its convenient manipulation in shifting the indicator 32 toward and from the cooperating measuring neck and scale.

To provide for the vertical adjustment of the indicator 32 which is necessary in determining the accurate measurement, the indicator is carried by a slide member 37 vertically adjustable in a slot 38 of the arm 33 and frictionally held in its adjusted position by means of a tension spring 39 bearing upon the arm and connected to the slide member 37 as shown in Figure 7. This slide member is also formed with a handle 40 for its convenient manipulation in adjusting the indicator. If it be desired to move the indicator 32 into a position away from the scale the squared portion 37$^a$ is withdrawn from slot 38 and the indicator turned by the handle 40.

In the use of the invention for measuring the contents of a testing receptacle it is only necessary to dispose the receptacle upon the base and adjust the scale so that the zero indicator registers with the base of the body within the neck portion to be measured. The cooperating measuring indicator is then adjusted into alignment with the upper surface of this body and the result is directly readable upon the scale, thus avoiding any necessity for computation and disposing the graduations in such position that they are protected against injury in the handling of the testing receptacle and the treatment of the contents thereof.

An important feature of the invention consists in the mounting of a plurality of scales so that the field of use is materially increased as in different classes of work the scale must vary relative to the volume capacity of the tube and the material therein to be measured. In the practical application of the invention shown, scales are provided for the measurement of cream, whole milk and skim or butter-milk, but the invention is not limited to the number of scales shown as it will be obvious that they may be varied and the scale holder constructed in accordance therewith.

It has also been found particularly convenient to mount the measuring indicator upon an arm which may be swung away from the neck of the testing receptacle so as to render such neck accessible for the insertion and removal of the receptacle while when raised into operative position this indicator extends across the field of the neck and cooperates with a scale. It will also be noted that the scales are held in their vertical adjusted position by means of the spring tension against the same and may be therefore conveniently raised and lowered as found necessary.

The construction also provides means by which the entire scale frame may be detached from its holder by a withdrawal of the securing post and another scale frame carrying a different set of scales substituted.

While the specific details of construction and application of the invention have been herein shown and described, it is not confined thereto as changes and alterations may be made without departing from the spirit of the invention as defined by the appended claims.

Having thus described my invention, what I claim as new and desire to secure by Letters Patent of the United States is:—

1. In testing apparatus, the combination of a base having a recess for the lateral introduction of a receptacle having a tubular neck portion, a scale upon said base, and measuring apparatus cooperating with said portion and scale and sustained by the base at the opposite sides of the space for said neck portion, one of said measuring apparatus being pivotally mounted to swing bodily.

2. In testing apparatus, the combination of a base having a recess for the lateral introduction of a receptacle having a tubular neck portion, a scale upon said base, and measuring apparatus cooperating with said portion and scale at the opposite sides of the space for the neck portion for measuring the contents of said neck portion, one of the measuring apparatus being pivoted to rotate and the other measuring apparatus being pivoted to swing bodily to and from an operative position relative to said neck portion.

3. In a testing apparatus, a base, a scale mounted thereon for vertical adjustment and carrying a pointer fixed on the scale at its lower portion, and a cooperating pointer mounted opposite the scale and adjustable relative to the first pointer and over the face of said scale.

4. In testing apparatus, the combination of a base having a recess for the introduction of a receptacle having a tubular neck portion and adapted to sustain said receptacle with the neck upstanding, a scale upon said base, and measuring apparatus sustained by the base at opposite sides of the space for the neck portion, one of said measuring apparatus cooperating with the neck and scale and being pivoted to the base to be swung vertically away from the space for the neck portion for affording easy access to said neck portion and the other apparatus carried by the scale to cooperate with said portion.

5. In testing apparatus, the combination of a base adapted to receive a container having a tubular neck portion, a scale upon said base, pointer supports pivoted to the base, one at each side of the space for the tubular neck portion, and pointers carried thereby and adapted to cooperate with such scale and tubular neck when the container is in position on the base, the pivotal mounting of the pointer supports enabling movement of one pointer in a horizontal plane and the other in a vertical plane away from operative relation to such neck.

6. In a testing apparatus, a base, a scale frame mounted thereon at one side of the base and provided with guide ways, a scale slidable in said guide ways, a zero indicator bodily movable with said scale and extending laterally therefrom, a support pivoted at the opposite side of the base, and a measuring indicator mounted thereon.

7. In a testing apparatus, a base, a scale frame mounted thereon at one side thereof and provided with guide ways, a scale slidable in said guide ways, a zero indicator bodily movable with said scale and extending laterally therefrom, a support pivoted at the opposite side of the base, and a measuring indicator mounted on the support for sliding movement longitudinally of the support.

8. In a testing apparatus, a base, a scale frame mounted at one side of the base and provided with guide ways, a scale slidable in said guide ways, a zero indicator carried by said scale and extending laterally therefrom, a support pivoted at the opposite side of the base, a measuring indicator mounted on the support for sliding movement longitudinally of the support, and tension means for frictionally retaining said measuring indicator in position.

9. In a testing apparatus, a base provided with a supporting recess for a testing receptacle open at one side, a scale support overlapping the upper portion of said recess, a scale thereon provided with an indicator, a supporting arm overhanging said recess, and a cooperating indicator adjustably mounted upon said arm.

10. In a testing apparatus, a holder having a recessed flange, a movably mounted post, a scale frame engaged by the post, a spring for supporting said frame in contact with the recessed flange, means upon the post to limit the vertical adjustment of said frame, and retaining means carried by the frame and adapted to cooperate with the recessed flange of said holder.

11. In a testing apparatus, a holder having a recessed flange, a slidingly mounted post, a scale frame engaged by the post, a spring for supporting said frame in contact with the recessed flange, means upon the post to limit the adjustment of said frame, retaining means carried by the frame and adapted to cooperate with the recessed flange of said holder, and means for removably securing said post in position.

12. In a testing apparatus, a base, a scale frame rotatably supported thereon, a plurality of scales carried by said frame each provided with an indicating pointer, and a cooperating member having a measuring pointer adapted to cooperate with any one of the scales when in position aligned thereto.

13. In a testing apparatus, a support adapted to receive a testing receptacle having a tubular neck portion, a scale mounted upon said support, an indicating pointer carried by the scale and cooperating with said neck portion, and a measuring indicator at the opposite side of the neck from the pointer and adjustably mounted to cooperate with said scale and said portion.

In testimony whereof I affix my signature.

WALTER PETERSEN